US011515786B2

(12) United States Patent
Guo et al.

(10) Patent No.: US 11,515,786 B2
(45) Date of Patent: Nov. 29, 2022

(54) TECHNIQUES FOR CURRENT SENSING FOR SINGLE-INDUCTOR MULTIPLE-OUTPUT (SIMO) REGULATORS

(71) Applicant: QUALCOMM Incorporated, San Diego, CA (US)

(72) Inventors: Linfei Guo, Daly City, CA (US); Chengwu Tao, Palo Alto, CA (US); Joseph Duncan, Carlsbad, CA (US); Xiaocheng Jing, San Jose, CA (US); Amir Parayandeh, San Francisco, CA (US); Xun Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/553,759

(22) Filed: Aug. 28, 2019

(65) Prior Publication Data

US 2021/0067035 A1    Mar. 4, 2021

(51) Int. Cl.
*H02M 3/156* (2006.01)
*H02M 1/00* (2006.01)

(52) U.S. Cl.
CPC ............ *H02M 3/156* (2013.01); *H02M 1/009* (2021.05)

(58) Field of Classification Search
CPC ..... H02M 3/1582; H02M 3/155–1588; H02M 3/04; H02M 3/07; H02M 3/158; H02M 2001/009; H02M 2001/0009; H02M 2001/0025; H02M 2001/0003; H02M 2003/1586; H02M 1/00; H02M 1/08
See application file for complete search history.

(56) References Cited

U.S. PATENT DOCUMENTS

| 6,075,295 | A * | 6/2000 | Li ........................ | H02M 3/158 307/38 |
| 7,679,349 | B2 * | 3/2010 | Kaplish ............... | G01R 19/0092 323/282 |
| 7,948,221 | B2 * | 5/2011 | Watanabe ............. | H02M 3/158 307/110 |
| 8,581,562 | B2 * | 11/2013 | Chen ..................... | H02M 3/158 323/282 |
| 8,994,345 | B2 * | 3/2015 | Wilson .................. | H02M 3/158 323/267 |
| 9,007,039 | B2 * | 4/2015 | Kim ...................... | H02M 3/158 323/267 |
| 9,041,304 | B2 * | 5/2015 | Li .......................... | H05B 45/37 315/200 R |
| 9,203,310 | B2 * | 12/2015 | Huang .................. | H02M 3/158 |

(Continued)

*Primary Examiner* — Thienvu V Tran
*Assistant Examiner* — Nusrat Quddus
(74) *Attorney, Agent, or Firm* — Haynes & Boone, LLP

(57) ABSTRACT

Aspects of the present disclosure generally relate to methods and apparatus for continuous current sensing for a single-inductor multiple-output (SIMO) regulator. One example method includes operating a plurality of switches of the SIMO regulator, via a plurality of control signals, according to a plurality of switching states using a switching controller, sensing currents associated with at least a portion of the plurality of switches of the SIMO regulator using a plurality of current sense circuits, and selectively outputting a sense current from one of the plurality of current sense circuits based on a change in the plurality of controls signals occurring between a transition from a first switching state to a second switching state of the plurality of switching states.

16 Claims, 10 Drawing Sheets

(56) References Cited

U.S. PATENT DOCUMENTS

| | | | | |
|---|---|---|---|---|
| 9,837,901 B1* | 12/2017 | Volk | | H02M 3/158 |
| 9,998,005 B2* | 6/2018 | Liu | | H02M 1/08 |
| 10,014,778 B1* | 7/2018 | Wei | | H02M 1/08 |
| 10,075,007 B2* | 9/2018 | Langlinais | | H02J 7/0068 |
| 10,097,017 B2* | 10/2018 | Greening | | H02J 7/0044 |
| 10,103,620 B1* | 10/2018 | Wei | | H02M 3/07 |
| 10,254,314 B1* | 4/2019 | Li | | H02M 1/08 |
| 10,291,117 B2* | 5/2019 | Petersen | | H02M 3/158 |
| 10,291,126 B1* | 5/2019 | Wei | | H02M 1/08 |
| 10,476,388 B2* | 11/2019 | Chen | | H02M 3/158 |
| 10,554,187 B2* | 2/2020 | Nentwig | | H03F 3/195 |
| 10,622,900 B1* | 4/2020 | Wei | | H02M 3/1582 |
| 2004/0114404 A1* | 6/2004 | Brkovic | | H02M 3/28 |
| | | | | 363/80 |
| 2004/0201281 A1* | 10/2004 | Ma | | H02M 3/158 |
| | | | | 307/38 |
| 2005/0264271 A1* | 12/2005 | Lam | | H02M 1/10 |
| | | | | 323/282 |
| 2008/0231115 A1* | 9/2008 | Cho | | H02M 3/158 |
| | | | | 307/41 |
| 2009/0218996 A1* | 9/2009 | Kaplish | | G01R 19/0092 |
| | | | | 323/272 |
| 2010/0026267 A1* | 2/2010 | Easwaran | | H02M 3/158 |
| | | | | 323/288 |
| 2011/0043181 A1* | 2/2011 | Jing | | H02M 3/158 |
| | | | | 323/288 |
| 2012/0043912 A1* | 2/2012 | Huynh | | H05B 45/46 |
| | | | | 315/297 |
| 2012/0274134 A1* | 11/2012 | Gasparini | | H02M 3/1584 |
| | | | | 307/31 |
| 2012/0286576 A1* | 11/2012 | Jing | | H02M 3/158 |
| | | | | 307/43 |
| 2012/0326615 A1* | 12/2012 | Li | | H05B 45/44 |
| | | | | 315/200 R |
| 2012/0326691 A1* | 12/2012 | Kuan | | H02M 3/158 |
| | | | | 323/299 |
| 2013/0162228 A1* | 6/2013 | Menegoli | | H02M 3/158 |
| | | | | 323/267 |
| 2013/0193943 A1* | 8/2013 | Wilson | | G05F 1/56 |
| | | | | 323/284 |
| 2013/0234513 A1* | 9/2013 | Bayer | | G05F 1/577 |
| | | | | 307/31 |
| 2014/0232189 A1* | 8/2014 | Gasparini | | H02M 3/158 |
| | | | | 307/31 |
| 2014/0232359 A1* | 8/2014 | Dash | | H02M 3/158 |
| | | | | 323/235 |
| 2014/0285014 A1* | 9/2014 | Calhoun | | H02M 3/158 |
| | | | | 307/31 |
| 2014/0354251 A1* | 12/2014 | Williams | | H02M 3/1584 |
| | | | | 323/271 |
| 2015/0364995 A1* | 12/2015 | Chen | | H02M 3/1584 |
| | | | | 323/271 |
| 2017/0025947 A1* | 1/2017 | Wang | | H02M 3/156 |
| 2017/0040892 A1* | 2/2017 | Rutkowski | | H02M 3/158 |
| 2017/0366086 A1* | 12/2017 | Calhoun | | H02M 3/158 |
| 2018/0092179 A1* | 3/2018 | Guo | | H05B 45/46 |
| 2018/0152144 A1* | 5/2018 | Choo | | H03F 3/19 |
| 2019/0068051 A1* | 2/2019 | Yang | | H02M 3/158 |
| 2019/0103766 A1* | 4/2019 | Von Novak, III | | H02M 3/1582 |
| 2019/0245435 A1* | 8/2019 | Botti | | H02M 3/158 |
| 2019/0356226 A1* | 11/2019 | Lin | | H02M 3/1582 |
| 2020/0021194 A1* | 1/2020 | Samid | | H02M 3/1582 |
| 2020/0076299 A1* | 3/2020 | Xue | | H02M 1/08 |
| 2020/0091836 A1* | 3/2020 | Lee | | H02M 7/4826 |
| 2020/0136523 A1* | 4/2020 | Gazit | | H02M 7/64 |
| 2020/0287464 A1* | 9/2020 | Lu | | H02M 3/158 |
| 2020/0304020 A1* | 9/2020 | Lu | | H02M 3/1582 |
| 2020/0381993 A1* | 12/2020 | Guo | | H02M 3/158 |

* cited by examiner

TECHNIQUES FOR CURRENT SENSING FOR SINGLE-INDUCTOR MULTIPLE-OUTPUT (SIMO) REGULATORS

TECHNICAL FIELD

Certain aspects of the present disclosure generally relate to electronic circuits and, more particularly, to circuits for power regulation.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A switching regulator may be implemented according to various topologies, such as a buck converter, boost converter, or buck-boost converter.

Power management integrated circuits (power management ICs or PMICs) are used for managing the power requirements of a host system. A PMIC may be used in battery-operated devices, such as mobile phones, tablets, laptops, wearables, etc., to control the flow and direction of electrical power in the devices. The PMIC may perform a variety of functions for the device such as direct-current (DC)-to-DC conversion, battery charging, power-source selection, voltage scaling, power sequencing, etc.

SUMMARY

Certain aspects of the present disclosure generally relate to a method and apparatus for sensing current for a single-inductor multiple-output (SIMO) regulator.

Certain aspects of the present disclosure provide for a single-inductor multiple-output (SIMO) regulation circuit. The SIMO regulation circuit generally includes an inductor, a plurality of current sense circuits, a first switch coupled to a first current sense circuit of the plurality of current sense circuits, the first switch having a first terminal coupled to a supply node and a second terminal coupled to a first terminal of the inductor, a second switch having a first terminal coupled to the inductor and a second terminal coupled to a reference voltage, a plurality of output switches, each of the plurality of output switches coupled to a respective current sense circuit of the plurality of current sense circuits and having a first terminal coupled to a second terminal of the inductor and a second terminal coupled to a respective output node of a plurality of output nodes.

Certain aspects of the present disclosure provide for a method for sensing current for a single-inductor multiple-output (SIMO) regulator. The method generally includes operating a plurality of switches of the SIMO regulator, via a plurality of control signals, according to a plurality of switching states using a switching controller, sensing currents associated with at least a portion of the plurality of switches of the SIMO regulator using a plurality of current sense circuits, and selectively outputting a sense current from one of the plurality of current sense circuits based on a change in the plurality of controls signals occurring between a transition from a first switching state to a second switching state of the plurality of switching states.

Certain aspects of the present disclosure provide for a single-inductor multiple-output (SIMO) regulator. The SIMO regulator generally includes a high-side switch coupled to a first current sense circuit, the high-side switch having a first terminal coupled to an input voltage and a second terminal coupled to a first terminal of an output inductor, a low-side switch having a first terminal coupled to the second terminal of the high-side switch and a second terminal coupled to a ground potential, a boost switch coupled to a second current sense circuit, the boost-switch having a first terminal coupled to a second terminal of the output inductor and a second terminal coupled to the ground potential, a first output switch coupled to a third current sense circuit, the first output switch having a first terminal coupled to the second terminal of the output inductor and a second terminal coupled to a first output node, a second output switch coupled to a fourth current sense circuit, the second output switch having a first terminal coupled to the second terminal of the output inductor and a second terminal coupled to a second output node, and a multiplexer coupled having a plurality of inputs coupled to respective outputs of the first, second, third, and fourth current sense circuits.

Certain aspects of the present disclosure provide for a single-inductor multiple-output (SIMO) regulator. The SIMO regulator generally includes means for operating a plurality of switches of the SIMO regulator, via a plurality of control signals, according to a plurality of switching states, means for sensing a plurality of currents associated with at least a portion of the plurality of switches of the SIMO regulator, and means for selectively outputting a sense current from one of the plurality of sensed currents based on a change in the operating of the plurality of switches occurring between a transition from a first switching state to a second switching state of the plurality of switching states.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Device

Figure 1:
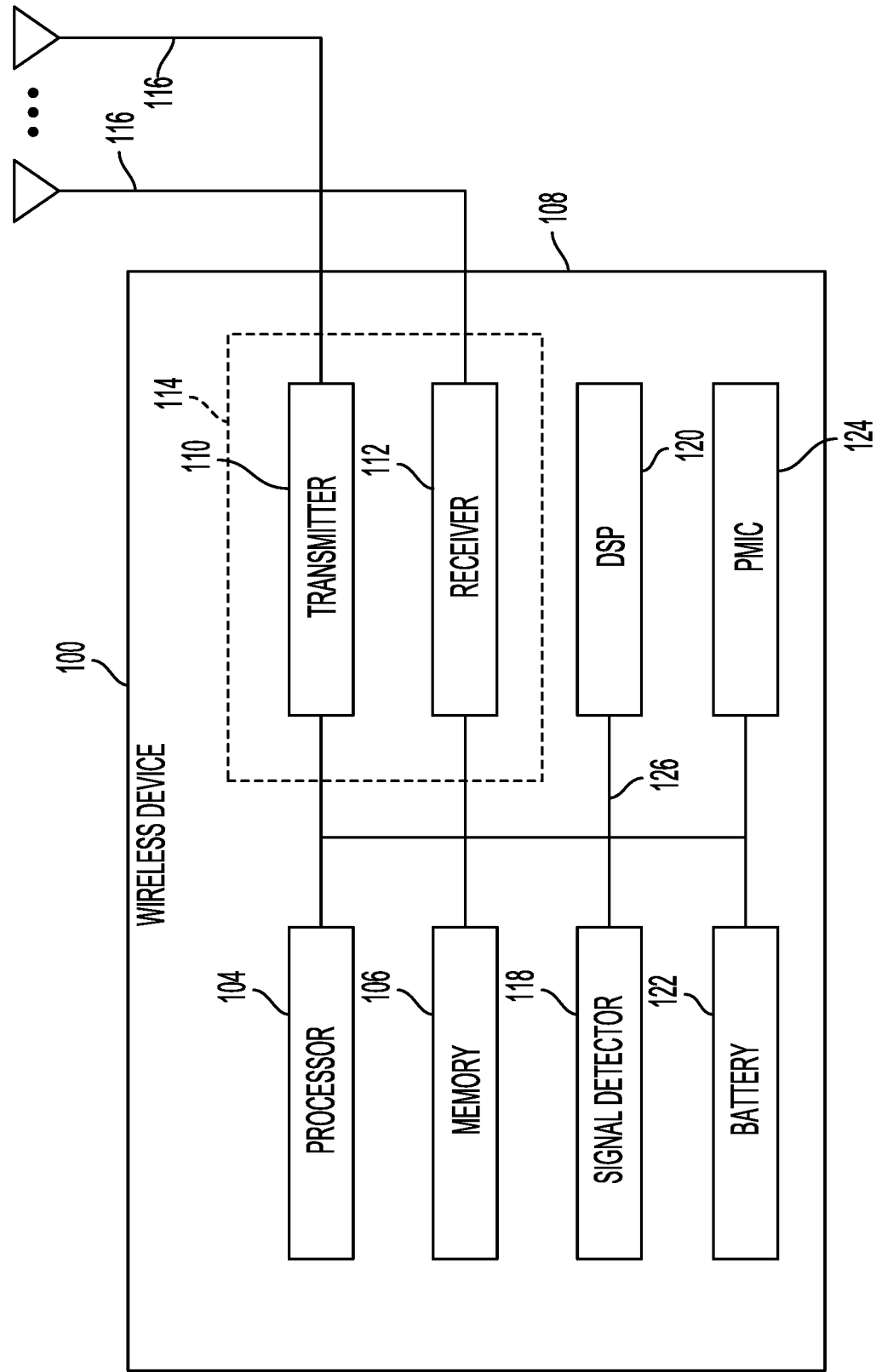
FIG. 1 is a block diagram of an example device including a power regulator, according to certain aspects of the present disclosure.

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of transmit antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 includes a voltage regulator which may be implemented using a single-inductor multiple-output (SIMO) switching regulator, as described in more detail herein.

The various components of the device 100 may be coupled together by a bus system 126, which may include a power bus, a control signal bus, and a status signal bus in addition to a data bus.

Example Switched-Mode Converter

A single-inductor multiple-output (SIMO) converter generally refers to a switching regulator that may be used to provide multiple regulated voltages for multiple outputs using a single inductor. However, it should be appreciated that a single inductor may include implementations using multiple inductors connected in parallel and/or series which form a single inductance value. In one implementation, a single-inductor SIMO converter may include two outputs. The first output of the SIMO converter may have a first voltage Vreg1, and the second output of the SIMO converter may have a second voltage Vreg2, which may be different than Vout1. Either of the output voltages Vreg1 and Vreg2 may be higher, lower, or equal to a supply (i.e., input) voltage (e.g., battery voltage (Vbat)) of the switching regulator. In other words, the two outputs of the SIMO converter may be two boost outputs if both outputs are greater than the supply voltage, two buck outputs if both outputs are less than the supply voltage, or one output may be a buck output and the other output may be a boost output.

In some cases, a switching regulator may measure (i.e., sense) the current through the inductive element. For example, a current sense circuit may be coupled to a switch of the regulator to measure a current through the switch. The measured current across the switch may be equivalent to the current through the inductive element. The measured current may be used by a switching controller of the switching regulator to further control the switches of the switching regulator. For example, a switching regulator may control the switches utilizing a peak current mode (PCM) and/or a valley current mode (VCM). However, in the context of SIMO converters, the outputs of the switching regulator may be change from being higher, lower, or same voltage as the supply voltage of the switching regulator. Accordingly, a measured current through the inductive element may not be guaranteed to be a peak and/or valley current which may make PCM and VCM unsuitable for SIMO converters. Alternatively, an average current mode (ACM) may be used by the switching regulator to control the switches. To maintain a desired level of accuracy, the current through the inductive element may be required to be continuously sensed by the switching regulator. However, when a switching regulator switches between different states, current information of the current through the inductive element may be lost, or be inaccurate for a period of time, when the switches change an operational state (i.e., turned "on" from being "off" and vice versa) which can lead to inaccuracy of the average current being used to control the switches.

Figure 2:
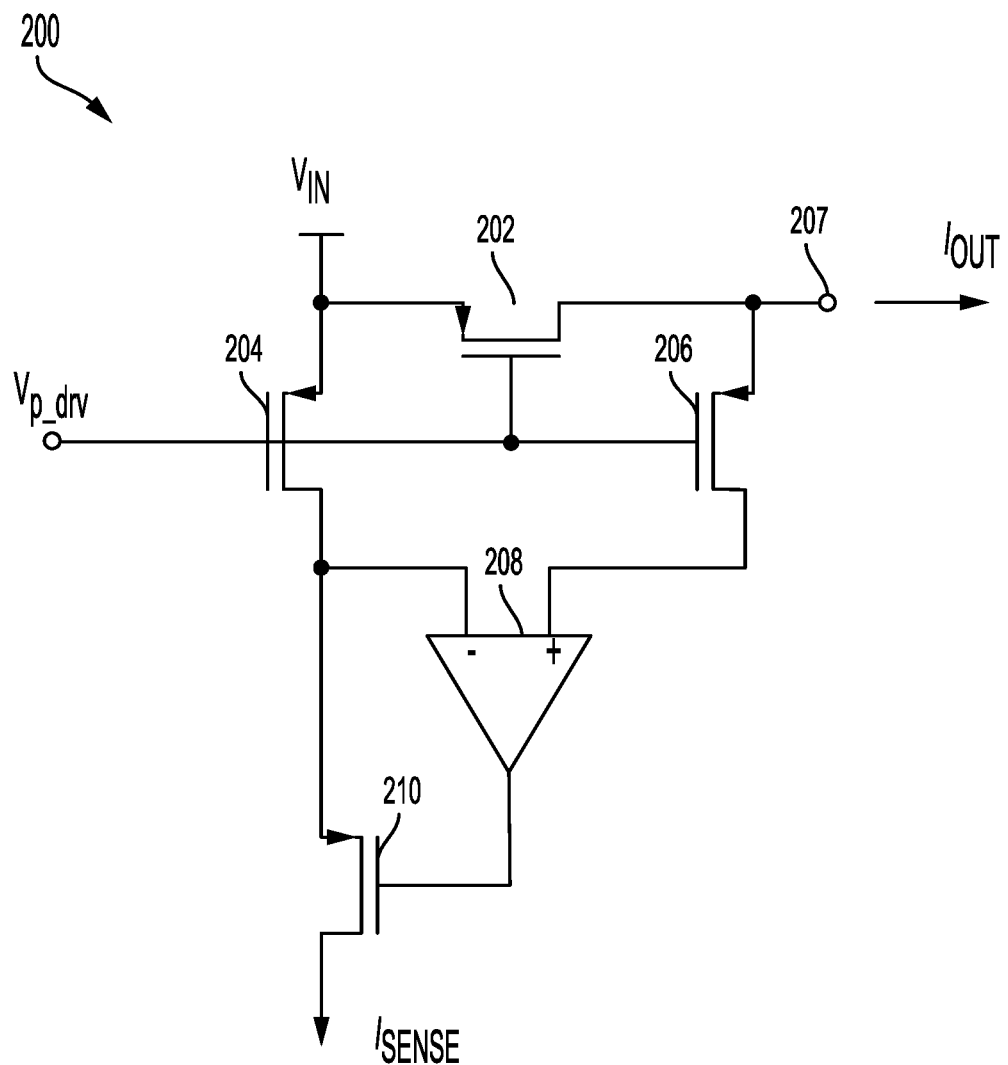
FIG. 2 is a circuit diagram of a prior art current sense circuit.

Referring now to FIG. 2, a circuit diagram of a prior art current sense circuit 200 is illustrated. The current sense circuit 200 is configured to measure a current flowing across a transistor 202 designated as Iout. The current is measured using a first sense transistor 204 having a source terminal coupled to a source terminal of transistor 202 and a second sense transistor 206 having a source terminal coupled to the drain terminal of the transistor 202. The gate terminals of the transistor 202, the first sense transistor 204, and second sense transistor 206 are coupled together and driven by a control signal Vp_drv. As the transistor 202, the first sense transistor 204, and second sense transistor 206 all comprise the same type of transistor (i.e., PMOS), when Vp_drv turns on (i.e., closes) transistor 202, the first sense transistor 204 and second sense transistor 206 are turned on as well. When the first sense transistor 204 and second sense transistor 206 are on, voltage information associated with the source terminal, coupled to a supply voltage Vin, and drain terminal, coupled to an output node 207, of transistor 202 is provided as inputs to an amplifier 208 via couplings to the respective drains of the first and second sense transistors 204, 206. The current sense circuit 200 further includes a third sense transistor 210 having a source coupled to a drain of the first sense transistor 204. The amplifier 208 outputs a difference between the voltages of the source and drain terminals to bias a gate terminal of the third sense transistor 210 to generate a sense current Isense, which is a replica current proportional to the output current Iout. However, current across the transistor 202 can only be sensed when the transistor 202 is on (as current is not flowing through the transistor in an off state). In addition, the current sense circuit 200 has an associated settling time, from an initial start-up, before the sense current Isense is sufficiently accurate (i.e., within an error tolerance) as a replica of Iout. As the current sense circuit 200 is enabled by the same signal controlling transistor 202, the sensed current upon transistor 202 turning on may not be accurate until the current sense circuit 200 output has settled.

Therefore, it is desirable to maintain current sensing of the current across the inductive element over changes in operational states of the switches to improve accuracy of the average current used by switching regulators implementing, for example, ACM.

Figure 3A:
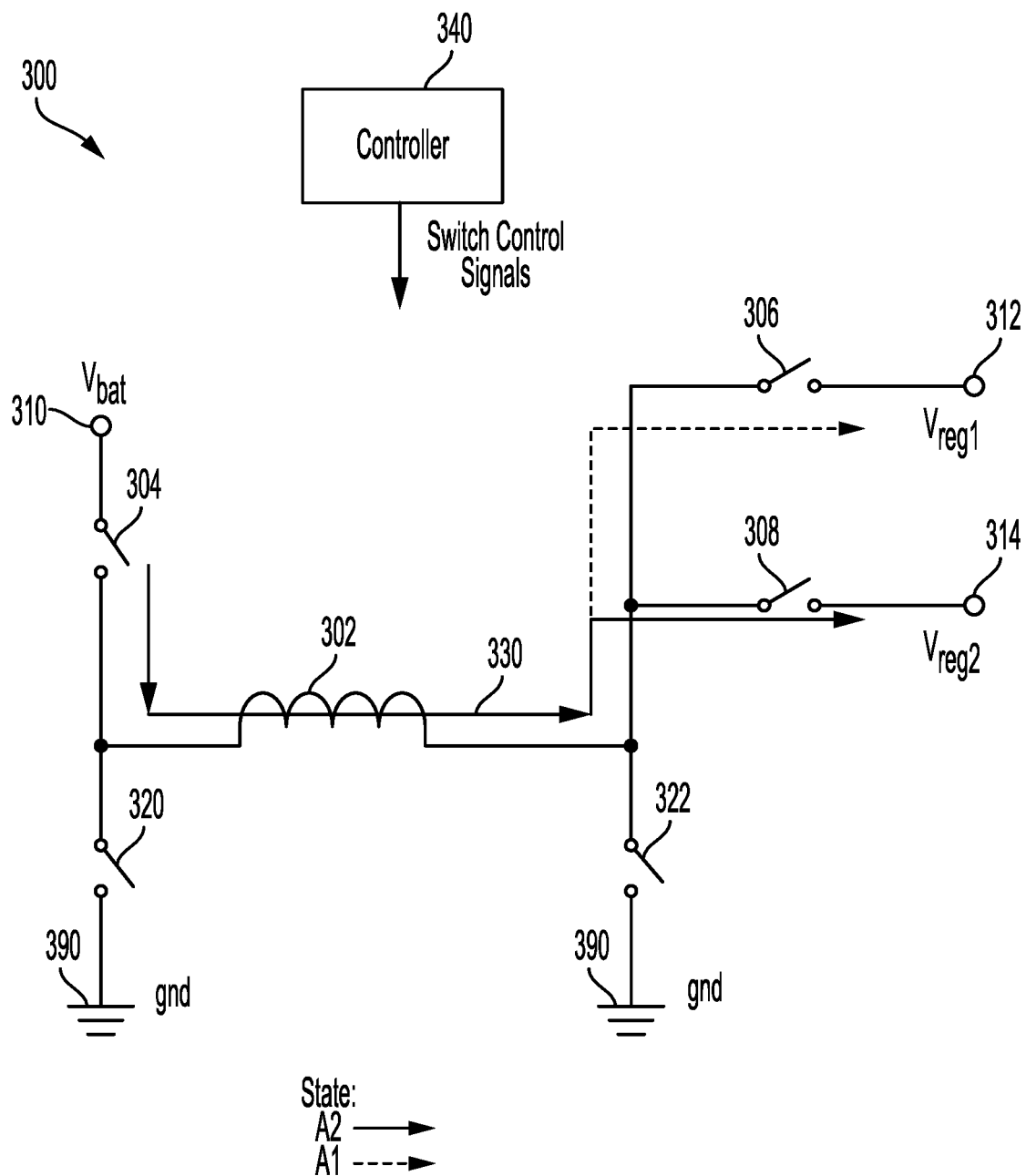
FIGS. 3A-3C are circuit diagrams of an example switching regulator in three different states.
Figure 3B:
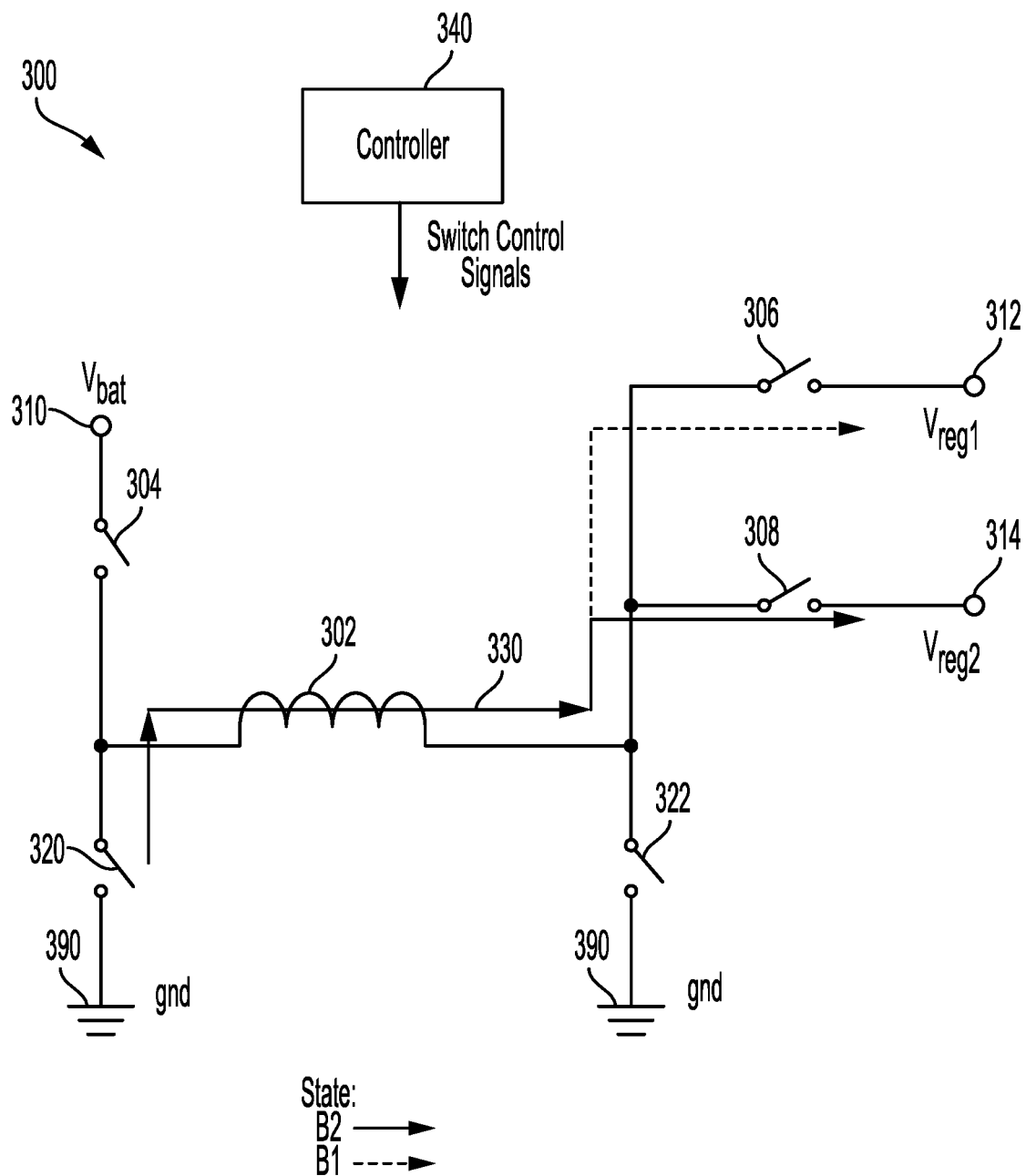
Figure 3C:
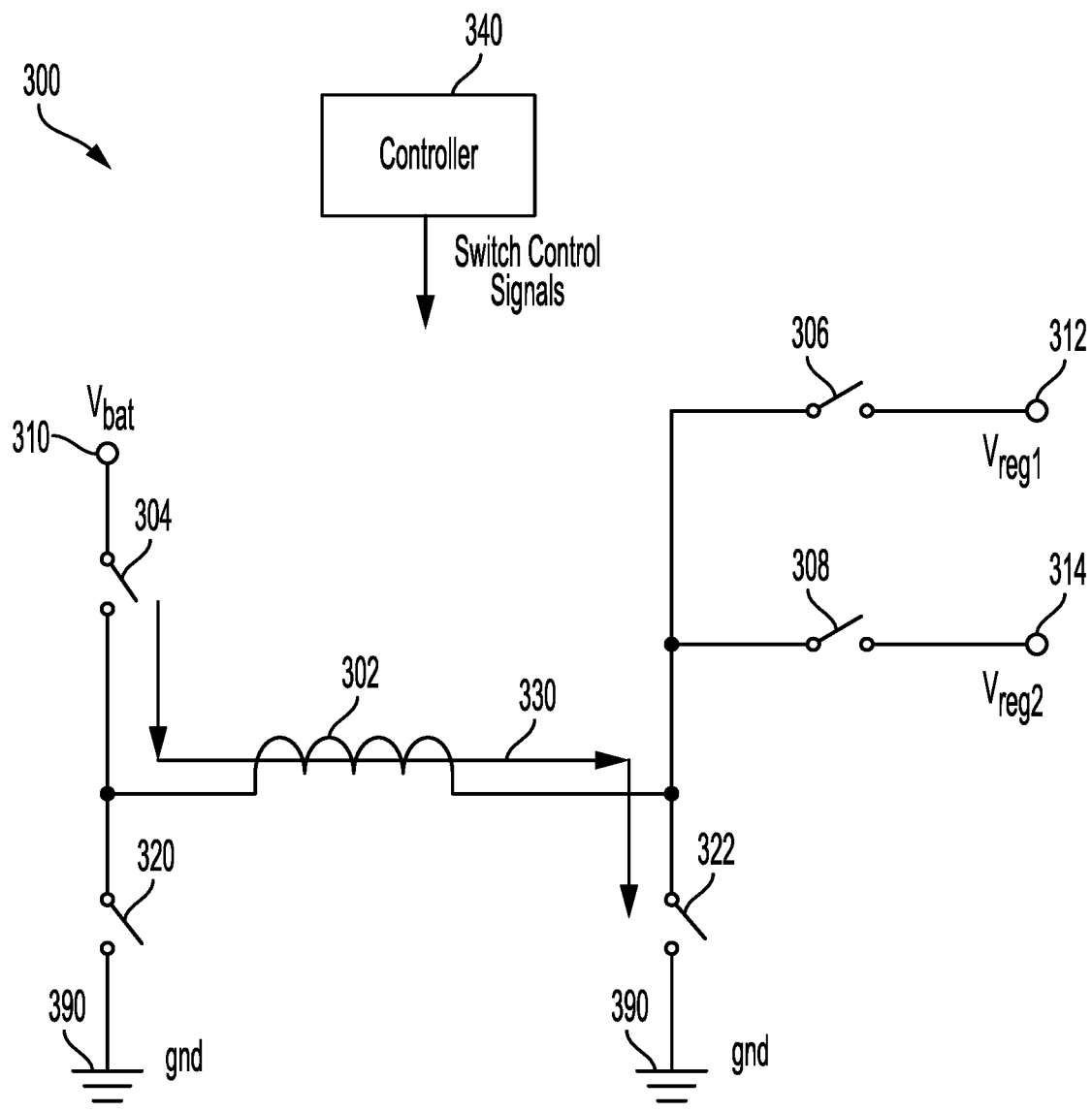

FIGS. 3A-3C are circuit diagrams of an example switching regulator 300 in three different states. The switching regulator comprises a plurality of switches configured to operate between open and closed states. In one implementation, the plurality of switches comprise field effect transistors (FET). For example, switch 304, switch 306, and switch 308 may comprises positive metal oxide semiconductor (PMOS) FETs while switch 320 and switch 322 comprise negative metal oxide semiconductor (NMOS) FETs. However, it will be appreciated that the switches may be configured according to different transistor topologies and doping types. In the illustrated buck-boost topology shown FIGS. 3A-C, switch 304 may be referred to as a high-side switch, switch 320 may be referred to as a low-side switch, switch 322 may be referred to as a boost-switch, and switches 306,308 may be referred to as output switches. As illustrated in FIG. 3A, in A1 and A2 states (collectively referred to as the A states), an inductive element 302 of the switching regulator 300 is coupled between a supply node 310 (e.g., providing the supply voltage or battery voltage (Vbat)) and one of the output nodes 312, 314 of the switching regulator 300. For example, in the A1 state for regulating Vreg1, switches 304, 306 are closed and switches 308, 320, 322 are opened via a controller 340 (also referred to as a switching controller), coupling the inductive element 302 between the supply node 310 and the output node 312. In the A2 state for regulating Vreg2, the switches 304, 308 are closed and switches 306, 320, and 322 are opened via the controller 340, coupling the inductive element 302 between the supply node 310 and the output node 314. In other words, in the A1 state, the inductor current 330 is directed to the output node 312, and in the A2 state, the inductor current 330 is directed to the output node 314. While only two A states are shown for an example SIMO converter of FIG. 3A, a person skilled in the art will recognize that there may be more than two A states when there are more than two switching regulator outputs.

In the A states, the inductor current 330 may ramp up or down depending on whether the output voltage to which the inductive element 302 is coupled has a voltage that is below the supply voltage (e.g., Vbat) or above the supply voltage. For example, in the A1 state, if the voltage (Vreg1) at the output node 312 is below the supply voltage at the supply node 310, the inductor current ramps up, but if the voltage (Vreg1) is above the supply voltage, the inductor current ramps down.

As illustrated in FIG. 3B, during B1 and B2 states (collectively referred to as the B states), the inductive element 302 of the switching regulator 300 may be coupled between a reference potential node 390 (e.g., electric ground (gnd)) for the switching regulator 300 and one of the output nodes 312, 314. For example, in the B1 state for regulating Vreg1, the switches 320, 306 are closed via the controller 340, coupling the inductive element 302 between the reference potential node and the output node 312. In the B2 state for regulating Vreg2, switches 320, 308 are closed and switches 304, 306, 322 are opened via the controller 340, coupling the inductive element 302 between the reference potential node and the output node 314. In other words, in the B1 state, the inductor current 330 is directed to the output node 312, and in the B2 state, the inductor current 330 is directed to the output node 314. In the B states, the inductor current 330 ramps down from a previous state since the inductive element 302 is coupled to the reference potential node through switch 320. While only two B states are shown for the example SIMO converter of FIG. 3B, a person skilled in the art will recognize that there may be more than two B states when there are more than two switching regulator outputs.

As illustrated in FIG. 3C, during a C1 state, the inductive element 302 of the switching regulator 300 is coupled between the supply node 310 and the reference potential node by closing switches 304, 322. During the C1 state, the inductive element 302 is charging, and the inductor current 330 ramps up as compared to a previous state.

Figure 4:
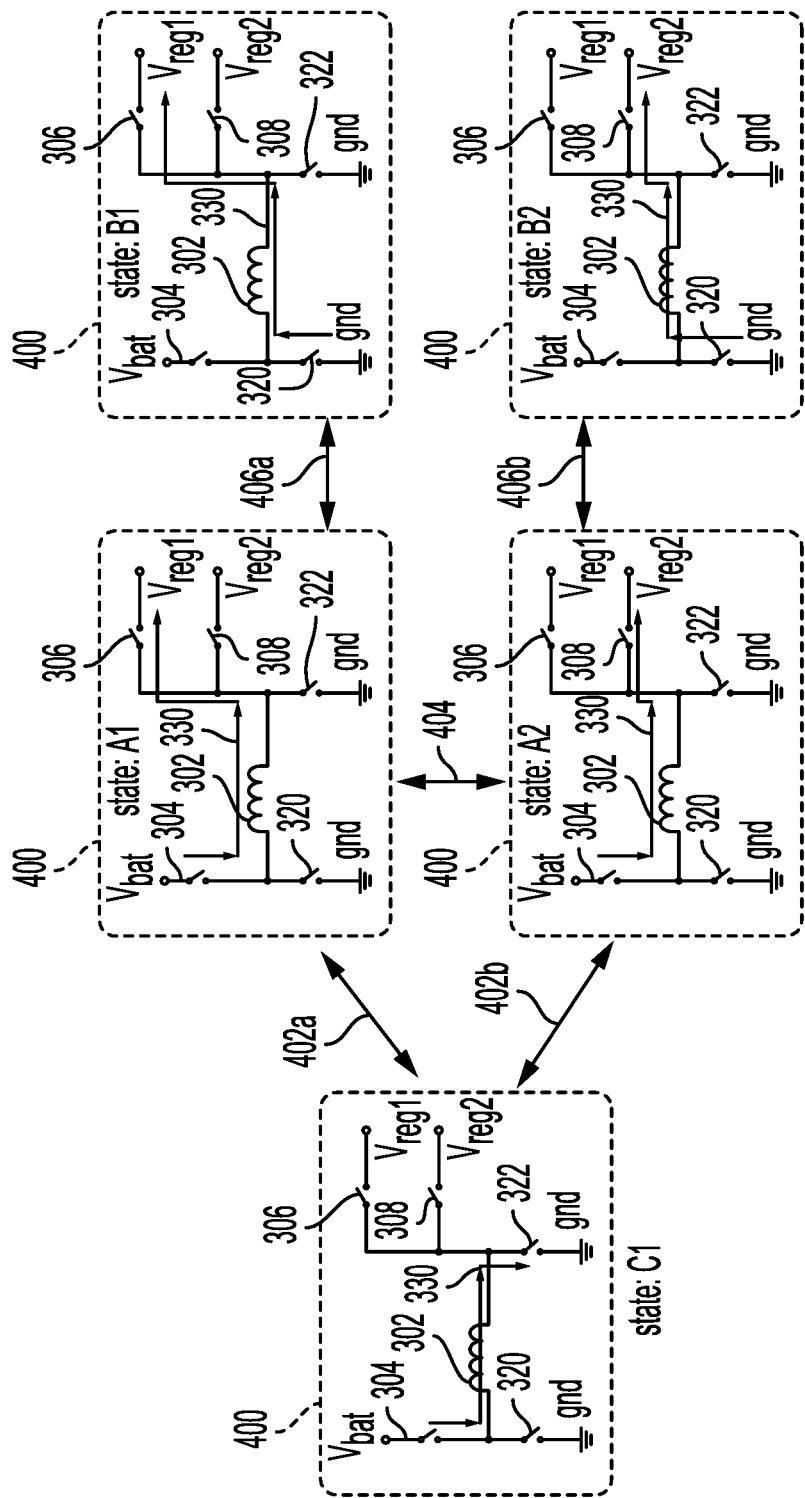
FIG. 4 is a flow diagram of example switching regulator switching state transitions for continuous current sensing, in accordance with certain aspects of the present disclosure.

Referring now to FIG. 4, a flow diagram of example state transitions of a switching regulator 400 for continuous current sensing is illustrated, in accordance with certain aspects of the present disclosure. The switching regulator 400 is configured according to the switching regulator 300 illustrated in FIGS. 3A-3C. However, the switching regulator further includes a current sense circuit (not shown) coupled to switch 304, a current sense circuit (not shown) coupled to switch 306, and a current sense circuit (not shown) coupled to switch 308, where each current sense circuit is configured to sense (i.e., measure) a current flowing through a respective switch. For example, the current sense circuit may be configured in accordance with the current sense circuit 200 of FIG. 2. In addition, the switching regulator 400 includes sense current selection circuitry (not shown) for selecting a sense current of the plurality of current sense circuits to be output as the sensed inductor current. For example, the output of the sensed inductor current may be coupled to an input of the controller 340 to be used for ACM control the switches of the switching regulator 400.

Beginning at state C1, the inductor element 302 is charging, via switch 304 and switch 322 being configured in a closed state. In the example implementation, switch 322 does not have an associated current sense circuit. Accordingly, the inductor current 330 is sensed by measuring the current flowing across closed switch 304 using the current sense circuit coupled to switch 304. However, it should be appreciated that a current sense circuit may be coupled to switch 322 in other implementations.

At transition 402, the switching regulator 400 transitions from the C1 state to an A state (i.e., state A1 or A2) to direct the inductor current 330 to the respective output node of the transitioned A state. As switch 322 has transitioned from a closed state (in state C1 to an open state in state A), no current is now flowing across switch 322 making no inductor current information available to be sensed at switch 322. In addition, as either switch 306 or switch 308 changed from an open state to a closed state for the A state transition, the current being sensed by a current sense circuit coupled to the respective closed switch 306,308 may not be settled thereby potentially causing the sensed circuit to be initially inaccurate. However, switch 304 has remained in the closed state between the transition of the C1 to the A state. Accordingly, the current being sensed by the current sense circuit coupled to switch 304 is used as the inductor sense current as the sense current may be deemed to be settled.

From the A state, the switching regulator 400 may a successive transition back to the C1 state, transition to a different A state (e.g., from state A1 to state A2), or transition to a B state. When transitioning back to the C1 state at transition 402, the current sensed from the current sense circuit coupled to switch 304 is used as the sensed inductor current as switch 304 has remained closed as sensed current information is not available at either switch 306 or switch 308 due to current no longer flowing across the switches 306,308 (i.e., as the switches are in open in state C1).

At transition 404, when transitioning from an A state to a different A state, the switches 306, 308 are changing between open and closed for their respective A states making sense current unavailable for the open switch or potentially inaccurate for the switch 306,308 that transitioned from being open to closed. However, as the inductor sense current as switch 304 remains closed for transitions between different A states, the current sensed by the current sense circuit coupled to switch 304 is used as the sensed inductor current.

At transition 406, when transitioning from an A state to a respective B state (i.e., from A1 to B1 or A2 to B2), switch 304 is open making no current available to be sensed across switch 304. However, the switch 306,308 of the B state has remained closed from the transition between the A state to the respective B state. According, the settled sense current from the current sense circuit coupled to the switch 306,308 is used as sensed inductor sensed current.

From the B state, the switching regulator 400 may transition from the B state to the respective A state (i.e., from B1 to A1 or B2 to A2). Similar to the transition between the A state to the respective B state, the sense current from the current sense circuit coupled to the switch 306,308 is used as the sensed inductor current as the switch 306,308 remains closed between the transition from the B state to the respective A state. While sense current is available for switch 304, as switch 304 is closed to the A state, the sensed current may not be initially settled upon the transition which may cause inaccuracy in the sensed inductor current.

In the example implementation of switching regulator 400, the controller 340 is configured to not perform a transition from a B state to another B state. While switch 320 remains closed in states B1 and B2, switch 320 does not have a respective current sense circuit and thus any current flowing across switch 320 cannot be sensed. In addition, switches 306,308 are changing from either open or closed thereby making respective sense currents unavailable (i.e., when open) or potentially inaccurate (i.e., when transitioned from open to closed). However, it should be appreciated that in another implementation, a current sense circuit can be coupled to switch 320 thereby allowing current to be sensed across switch 320 which may allow continuous current sensing when transitioning between different B states.

The controller 340 is also configured to not perform direct transitions between the C1 state and a B state as well as transitions between an A state and a different B state (i.e., from A1 to B2, from A2 to B2, and vice versa) as any sensed current by a current sense circuit coupled to the switches will be either unsettled or unavailable. For example, no switches that are closed in the C1 state remain closed in a transition to a B state. Therefore, any sense current by a current sense circuit coupled to a switch now closed in the B state from the C1 state, may be unsettled and thus inaccurate. As the sense current may be unreliable for a portion of time, such a transition may not be suitable for switching regulator implementing ACM using a continuously sensed current.

Figure 5:
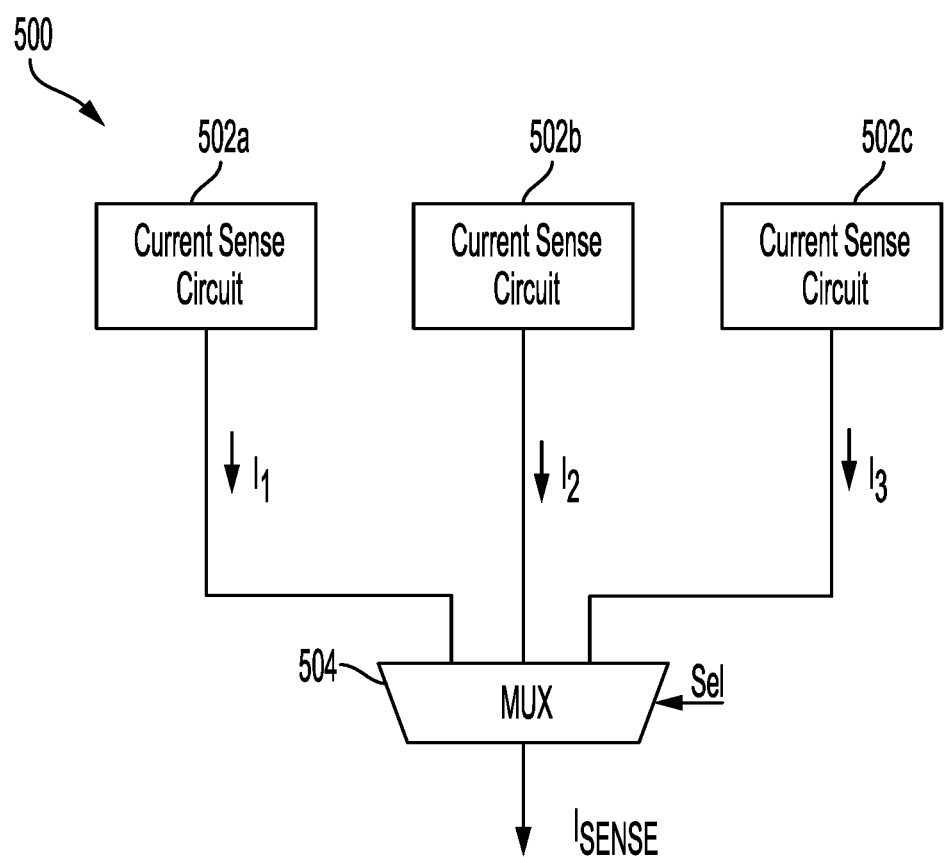
FIG. 5 is a block diagram of an example sense current selection architecture 500 for the switching regulator of FIG. 4, in accordance with certain aspects of the present disclosure.

Referring now to FIG. 5, a block diagram of an example sense current selection architecture 500 for the switching regulator of FIG. 4 is illustrated, in accordance with various aspects of the present disclosure. The sense current selection architecture 500 comprises a plurality of current sense circuits 502 having a sense current output coupled to respective sense current inputs of a multiplexer (MUX) 504. In the example implementation, the current sense circuit 502a is coupled to switch 304 and configured to output sense current $I_1$, the current sense circuit 502b is coupled to switch 306 and configured to output sense current $I_2$, and the current sense circuit is coupled to switch 308 and configured to output sense current $I_3$. The multiplexer 504 is configured to receive a selection signal (SEL) at an input to select which of the current sense inputs to output as sensed current output (Isense). The sensed current output Isense may also be referred to, such as in the context of switching regulator 400, as the sensed inductor current. The SEL signal is based on a transition from a current state to a next state of the switching regulator 400. In one implementation, the SEL signal is generated by the controller 340 that is controlling the switches of the switching regulator 400. In another implementation, the SEL signal is generate by control logic external to the controller 340. The SEL signal may comprise a single signal input or multiple signal inputs. While the example sense current selection architecture 500 only illustrates three current sense circuits 502a-c, it should be appreciated that any number of current sense circuits may be implemented according to the switching regulator topology.

Figure 6:
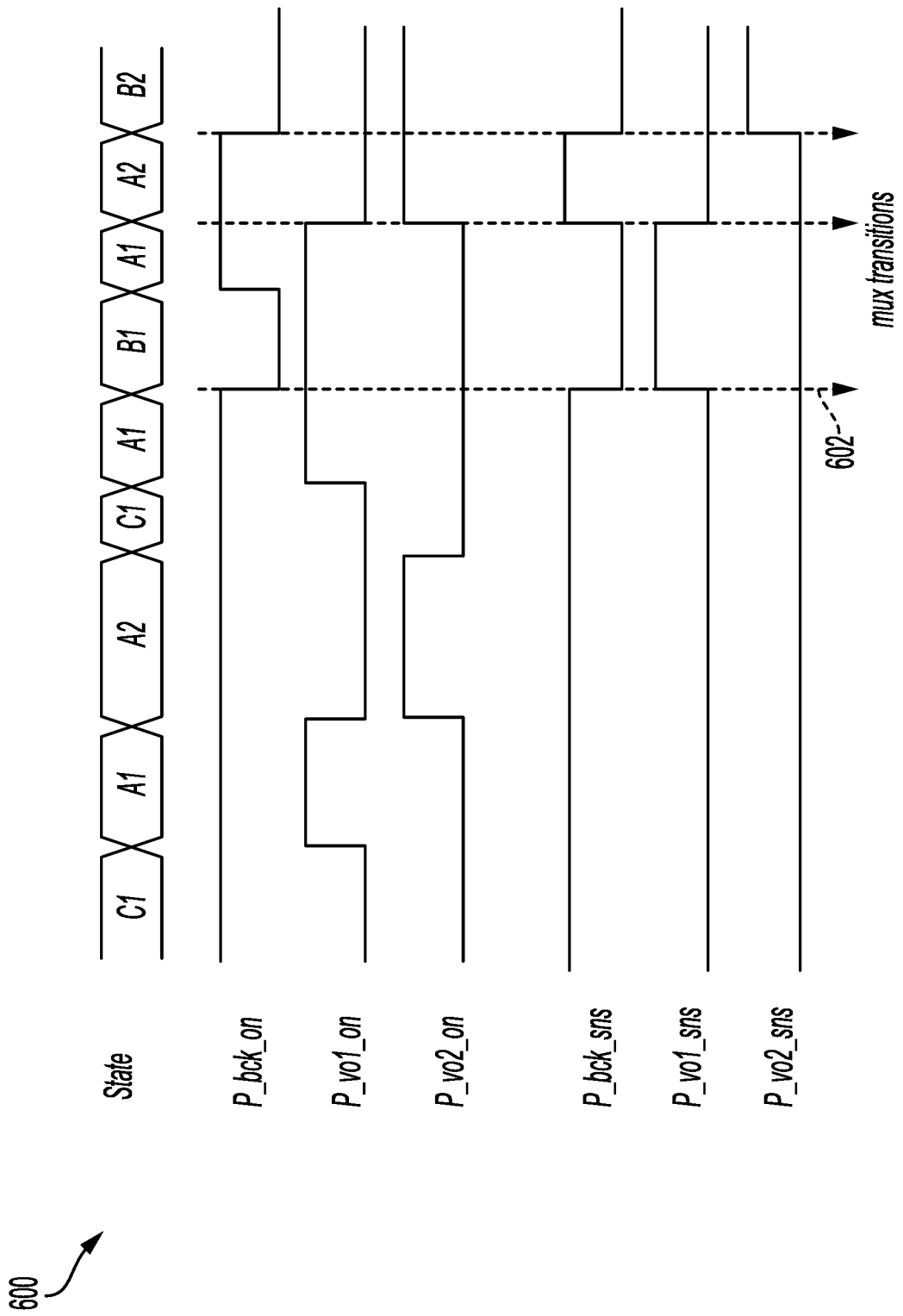
FIG. 6 is a timing diagram of an example switching regulator, in accordance with certain aspects of the present disclosure.

Referring now to FIG. 6, a timing diagram 600 of an example sense current selection scheme of a switching regulator of FIG. 4 is illustrated, in accordance with various aspects of the present disclosure. The timing diagram illustrates transitions between various switching states of the switching regulator, labeled as State. The timing diagram 600 consists of three control signals indicating when a switch of the switching regulator with a current sense circuit is closed (i.e., on), indicated by logic level high, and when the switch is open (i.e., off), indicated by logic level low, according to the corresponding state of the switching regulator. The first control signal (P_bck_on) controls switch 304, the second control signal (P_vo1_on) controls switch 306, and the third control signal (P_vo2_on) controls switch 308. The timing diagram 600 also consists of three signals that indicate which sense current from the current sense circuits of the respective switches 304, 306, 308 is selected to be used, indicated by logic level high, as the output from the multiplexer 504. The first mux signal (P_bck_sns) indicates when the sense current associated with switch 304 is selected, the second mux signal (P_vo1_sns) indicates when the sense current associated with switch 306 is used, and the third mux signal (P_vo2_sns) indicates when the sense current associated with switch 308 is used. A change in the selected sense current output from the multiplexer 504 is indicated by the lines label as mux transitions. Using the first mux transition 602 as an example, the multiplexer in prior states before the first mux transition 602 has maintained a closed state for switch 304 (as indicated by P_bck_on) even though switch 306 and switch 308 have been changing between open and closed states. As the switch 304 has remain closed, with an assumed settled sense current, the multiplexer has maintained a selected output of the sense current associated with switch 304. However, at the first mux transition 602, the switching regulator changes between state A1 and state B1 causing switch 304 to be opened, from being closed, thereby not being able to provide a sense current. Switch 308 remains in an open state between the transition from state A1 to state B1 and therefore also cannot provide a sense current. However, switch 306 has remained in a closed state during the transition from state A1 to state B1, and therefore is assumed to have a settled sense current. Upon the first mux transition 602, the multiplexer 504 switches from providing the sense current associated with switch 304 and instead provides the sense current from switch 306 using the mux signal P_vo1_sns. By maintaining an output of settled sense current at the output of the multiplexer 504 between state transitions, accuracy in continuously monitoring the inductor current can be improved. It should be appreciated that the continuous monitoring may include slight incontinuities in current sensing, such as due to a potential delay in receiving a sense current due to multiplexer switching. However, such delays may be sufficiently small as to not significantly impact operating of the switching regulator.

Figure 7:
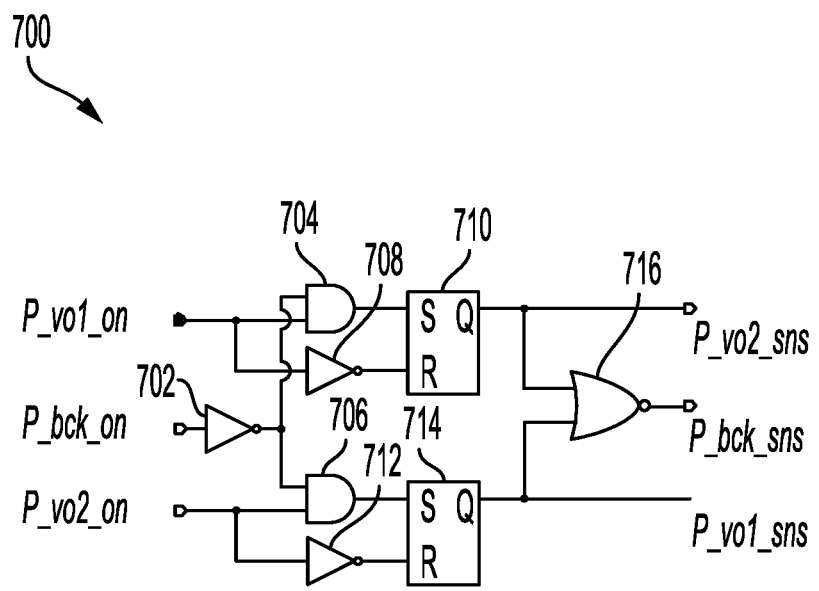
FIG. 7 is a circuit diagram of an example logic circuit for controlling a sense current multiplexer, in accordance with certain aspects of the present disclosure.

Referring now to FIG. 7, a circuit diagram of an example logic circuit 700 configured to generate the multiplexer select signals of FIG. 6 is illustrated, in accordance with various aspects of the present disclosure. The logic circuit 700 may be referred to as selection control logic. The inputs of the logic circuit 700 include the first control signal P_bck_on of switch 304, the first control signal P_vo1_on of switch 306, the first control signal P_vo2_on of switch 308. The first control signal P_bck_on is coupled to an input of a first inverter 702. The output of the first inverter 702 is coupled to a first input of a first AND gate 704 and a first input of a second AND gate 706. The second control signal P_vo1_on is coupled to a second input of the first AND gate 704 and a second inverter 708. The output of the first AND gate 704 is coupled to an S input of a first RS flip-flop 710 and the output of the second inverter 708 is coupled to the R input of the first RS flip-flop 710. The third control signal P_vo2_on is coupled to an input of a third inverter 712 and a second input of the second AND gate 706. The output of the second AND gate 706 is coupled to an S input of a second RS flip-flop 714 and the output of the third inverter 712 is coupled to the R input of the second RS flip-flop 714. The third mux signal P_vo2_sns comprises an output signal from the Q output of the first RS flip-flop 710 and the second mux signal P_vo1_sns comprises an output signal from the Q output of the second RS flip-flop 714. The Q outputs of the first RS flip-flop 710 and the second RS flip-flop 714 are also coupled to respective inputs of an XNOR gate 716. The output signal of the XNOR gate 716 comprises the first mux signal P_bck_sns.

Figure 8:
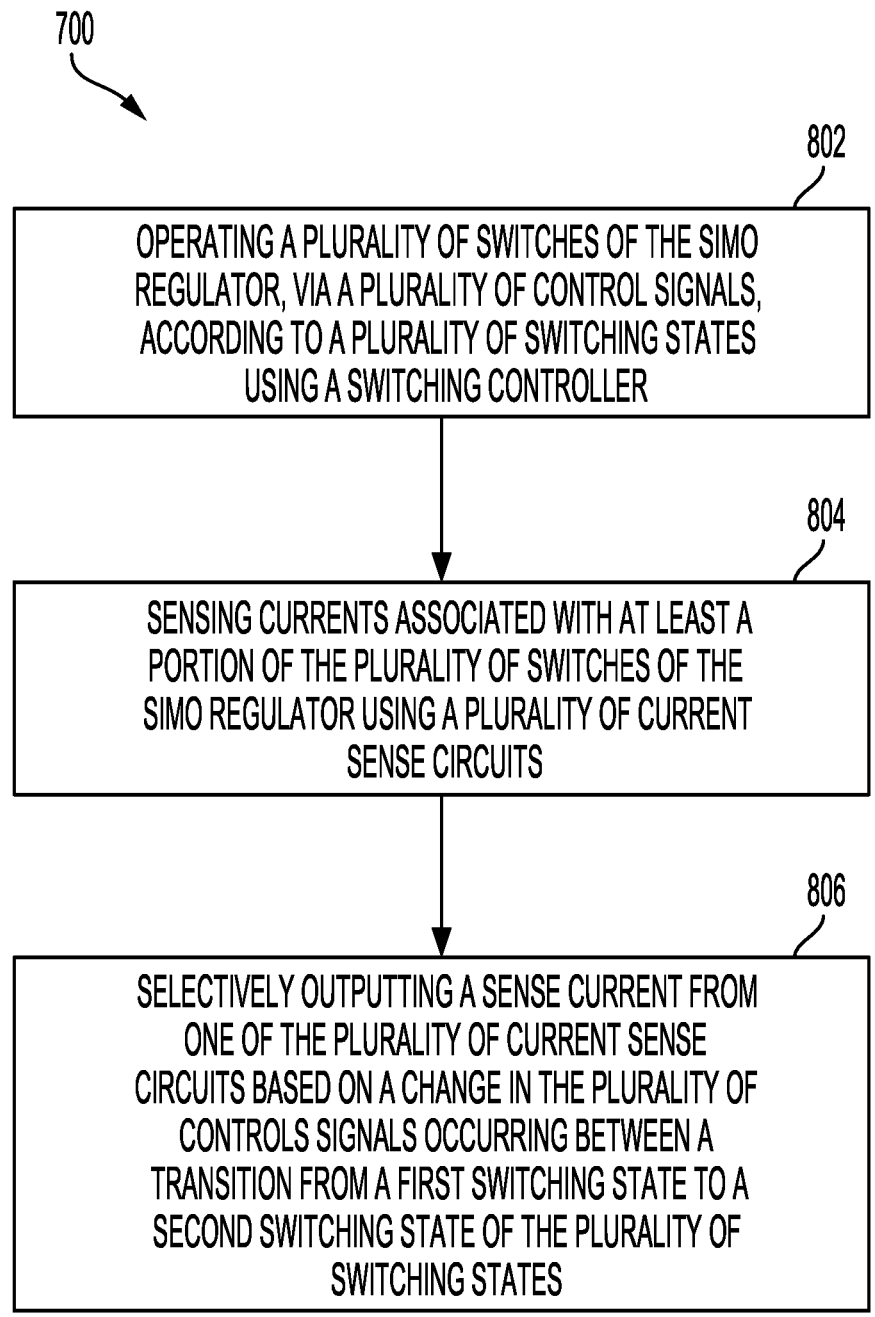
FIG. 8 is a flow diagram illustrating example operations for continuous sensing current of a switching regulator, in accordance with certain aspects of the present disclosure.

Referring now to FIG. 8, an example operation 800 for continuously sensing current for a single-inductor multiple-output (SIMO) regulator is illustrated, in accordance with various aspects of the present disclosure.

At block 802, a plurality of switches of the SIMO regulator are operated, via a plurality of control signals, according to a plurality of switching states using a switching controller. In one implementation, a controller outputs control signals to control whether the switches are in an open or closed state in order to regulate one or more outputs of the SIMO regulator. For example, the switches may comprise transistors and the controller outputs voltage signals to gate terminals of the transistors to bias the transistors between the open and closed states. In addition, the controller may prevent transitions between certain switching states, such as those transitions that would result in an unavailability of a settled sense current of the SIMO regulator.

At block 804, currents associated with at least a portion of the plurality of switches of the SIMO regulator are sensed using a plurality of current sense circuits. In one implementation, a current sense circuit is coupled to each of the plurality of switches. The current sense circuit may also be controlled based on the control signal of the respective switch. For example, the current sense circuit may be configured to only output a sense current when the control signal asserted is operating the switch in a closed state. However, it will be appreciated that current sense circuit may be controlled separately from the associated switch. In another implementation, a current sense circuit may be omitted from one or more switches. For example, switches that would provide a redundant a sense current based on the operation of the plurality of switches may be omitted, which may save cost and provide power and area savings.

At block 806, a sense current from one of the plurality of current sense circuits is selectively outputted based on a change in the plurality of controls signals occurring between a transition from a first switching state to a second switching state of the plurality of switching states. In one implementation, the outputs of the plurality of the current sense circuits are coupled to inputs of a multiplexer. A select signal is used to control the multiplexer to control which of the sense currents received from the plurality of current sense circuits to use as the output of the multiplexer. For example, the select signal may be based on a determination of which switch, having an associated current sense circuit, remained closed during a transition from a first switching state and a second switching state. As the switch remained closed between the first and second switching state, the sense current from the current sense circuit associated with the determined switch may be assumed to have settled, and thus is within an accuracy tolerance. Accordingly, the select signal may be used to select to output a settled sense current from the available inputs of the multiplexer. The outputted sense current may be indicative of the current across an inductor of the SIMO regulator and thus may be referred to as the inductor sense current. The inductor sense current may be received at the switching controller of the SIMO regulator in order to control operation of the plurality of switching, for example, according to an average current mode.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In certain aspects, means for operating a plurality of switches of the SIMO regulator may be a controller, such as controller 340. In certain aspects, means for sensing a plurality of currents associated with at least a portion of the plurality of switches of the SIMO regulator may be a current sense circuit, such as current sense circuit 502. In certain aspects, means for selectively outputting a sense current may be a multiplexer, such as multiplexer 504. In certain aspects, means for determining which switch having an associated sense current of the plurality switches remains in a closed state during the transition from the first switching state and the second switching state may comprise a logic circuit, such as logic circuit 700.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with discrete hardware components designed to perform the functions described herein. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A single-inductor multiple-output (SIMO) regulation circuit, comprising: an inductor;
   a plurality of current sense circuits;
   a first switch coupled to a first current sense circuit of the plurality of current sense circuits, the first current sense circuit configured to generate a sense current based on an output current of the first switch, the first switch having a first terminal coupled to a supply node and a second terminal coupled to a first terminal of the inductor;
   a second switch having a first terminal coupled to the inductor and a second terminal coupled to a reference voltage;
   a plurality of output switches, each of the plurality of output switches coupled to a respective current sense circuit of the plurality of current sense circuits, the respective current sense circuits each configured to generate a sense current based on an output current of the respectively coupled output switch, the plurality of output switches having a first terminal coupled to a second terminal of the inductor and a second terminal coupled to a respective output node of a plurality of output nodes, the plurality of output switches including a third switch having a first terminal coupled to the second terminal of the inductor and a second terminal coupled to the reference voltage;
   a multiplexer having a plurality of inputs and an output, each of the plurality of inputs being coupled to a respective output of the plurality of current sense circuits;
   a controller configured to output control signals to the first switch and to the plurality of output switches; and
   selection control logic configured to output a selection signal to the multiplexer, the selection control logic receiving the control signals and generating the selection signal based on the control signals.

2. The SIMO regulation circuit of claim 1, wherein the a controller is configured to switch the first switch, the second switch, and the plurality of output switches between a plurality of switching states.

3. The SIMO regulation circuit of claim 2, wherein the multiplexer is configured to output an inductor sense current via a current sense circuit of the plurality of current sense circuits having a settled sense current during a switching state of the plurality of switching states.

4. The SIMO regulation circuit of claim 3, wherein the controller is configured to control the plurality of switching states to maintain at least one settled sense current from the plurality current sense circuits.

5. The SIMO regulation circuit of claim 3, wherein the controller is configured to: receive the inductor sense current; and
   operate the SIMO regulation circuit according to an average current mode based on the inductor sense current.

6. The SIMO regulation circuit of claim 2, wherein the multiplexer is configured to output a sense current of a current sense circuit of the plurality of current sense circuits associated with a switch in a closed configuration in both a first switching state and an immediately successive second switching state of the plurality of switching states.

7. The SIMO regulator of claim 6;
   wherein the output of the multiplexer is configured based on the selection signal.

8. The SIMO regulation circuit of claim 1, wherein the first terminal of the second switch is coupled to the second terminal of the inductor.

9. The SIMO regulation circuit of claim 1, wherein the first terminal of the second switch is coupled to the second terminal of the first switch and the first terminal of the inductor.

10. A single-inductor multiple-output (SIMO) regulator, comprising:

a high-side switch coupled to a first current sense circuit, the high-side switch having a first terminal coupled to an input voltage and a second terminal coupled to a first terminal of an output inductor;

a low-side switch having a first terminal coupled to the second terminal of the high-side switch and a second terminal coupled to a ground potential;

a boost switch coupled to a second current sense circuit, the boost switch having a first terminal coupled to a second terminal of the output inductor and a second terminal coupled to the ground potential;

a first output switch coupled to a third current sense circuit, the first output switch having a first terminal coupled to the second terminal of the output inductor and a second terminal coupled to a first output node;

a second output switch coupled to a fourth current sense circuit, the second output switch having a first terminal coupled to the second terminal of the output inductor and a second terminal coupled to a second output node;

a multiplexer having a plurality of inputs coupled to respective outputs of the first, second, third, and fourth current sense circuits;

a controller configured to control switching operation of the high-side switch, the first output switch, and the second output switch via a plurality of control signals; and logic coupled to the controller and configured to receive the plurality of control signals and to generate one or more multiplexer select signals based on the plurality of control signals.

11. The SIMO regulator of claim 10, wherein the multiplexer is configured to output a sense current from one of the first, second, third, and fourth current sense circuits having a settled sense current for a switching state of a plurality of switching states of the SIMO regulator.

12. The SIMO regulator of claim 11, wherein the controller is configured to control the high-side switch, the low-side switch, the boost switch, the first output switch, and the second output switch according to a plurality of switching states.

13. The SIMO regulator of claim 12;
wherein an output of the multiplexer is based on the generated one or more multiplexer select signals.

14. The SIMO regulator of claim 12, wherein the SIMO regulator is configured to continuously output a sense current associated with the output inductor from an output of the multiplexer.

15. The SIMO regulator of claim 14, wherein the controller is configured to prevent a transition between switching states of the plurality of switching states that would result in an unavailability of a settled sense current from at least one of the first, second, and third current sense circuits at the transition between the switching states.

16. The SIMO regulator of claim 14, wherein the SIMO regulator is configured to operate according to an average current mode based on the outputs of the first, second, third, and fourth current sense circuits.

* * * * *